(12) United States Patent
Schoolcraft et al.

(10) Patent No.: US 7,832,055 B2
(45) Date of Patent: Nov. 16, 2010

(54) HINGE

(75) Inventors: Kevin John Schoolcraft, Raleigh, NC (US); Daniel James VanEpps, Jr., Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 226 days.

(21) Appl. No.: 10/908,168

(22) Filed: Apr. 29, 2005

(65) Prior Publication Data

US 2006/0143863 A1 Jul. 6, 2006

Related U.S. Application Data

(60) Provisional application No. 60/593,267, filed on Dec. 30, 2004.

(51) Int. Cl.
*E05D 11/10* (2006.01)

(52) U.S. Cl. .............................. 16/347; 16/337; 16/374; 16/330

(58) Field of Classification Search .................. 16/347, 16/374, 337, 340, 287, 302, 327, 328, 330–332, 16/334, 366, 367, 679.06, 679.07, 679.11, 16/679.12, 679.15, 679.16, 679.2, 679.27, 16/679.28; 455/90.3, 575.1; 379/428.01, 379/433.13; 248/917–921; 361/680–683, 361/679.06, 679.07, 679.11, 679.12, 679.15, 361/679.16, 679.2, 679.27, 679.28

See application file for complete search history.

(56) References Cited

U.S. PATENT DOCUMENTS 5,141,446 A * 8/1992 Ozouf et al. ................. 439/165
5,274,882 A 1/1994 Persson (Continued)

FOREIGN PATENT DOCUMENTS

EP 1 450 545 8/2004
JP 2003 239942 12/2003

OTHER PUBLICATIONS

Sony Ericsson Mobile Communications AB, International Application No. PCT/US05/028600, Written Opinion, Dec. 8, 2005.

(Continued)

*Primary Examiner*—Victor Batson
*Assistant Examiner*—Jeffrey O'Brien
(74) *Attorney, Agent, or Firm*—R. Brian Drozd; Moore & Van Allen PLLC

(57) ABSTRACT

A hinge for use in a mobile terminal comprises a first hinge portion defining an opening and having a slot extending from the periphery of the first hinge portion to the opening, and a second hinge portion defining an opening and having a slot extending from the periphery of the second hinge portion to the opening. The first hinge portion is one body portion of the mobile terminal, and the second hinge portion is secured to the other body portion. The hinge portions are rotatably connected such that the openings are aligned. The hinge portions are relatively rotatable between a first position where the slot in the first hinge portion and the slot in the second hinge portion are aligned, and a second position where the slot in the first hinge portion and the slot in the second hinge portion are not aligned and the openings cannot be accessed from the exterior of the hinge.

21 Claims, 12 Drawing Sheets

U.S. PATENT DOCUMENTS

| | | | |
|---|---|---|---|
| 5,390,075 A * | 2/1995 | English et al. | 16/386 |
| 5,572,769 A * | 11/1996 | Spechts et al. | 16/337 |
| 5,751,544 A * | 5/1998 | Song | 361/681 |
| 5,881,150 A | 3/1999 | Persson | |
| 5,915,015 A | 6/1999 | Thornton | |
| 5,951,312 A | 9/1999 | Horng et al. | |
| 5,987,122 A | 11/1999 | Daffara et al. | |
| 6,122,801 A | 9/2000 | Reichert et al. | |
| 6,148,079 A | 11/2000 | Chintala et al. | |
| 6,148,480 A | 11/2000 | Cooke | |
| 6,149,442 A | 11/2000 | Enright | |
| 6,157,717 A | 12/2000 | Chintala et al. | |
| 6,195,431 B1 | 2/2001 | Middleton | |
| 6,292,980 B1 | 9/2001 | Yi et al. | |
| 6,301,489 B1 | 10/2001 | Winstead et al. | |
| 6,470,175 B1 | 10/2002 | Park et al. | |
| 6,633,643 B1 | 10/2003 | Ona | |
| 6,678,539 B1 | 1/2004 | Lu | |
| 6,692,275 B2 * | 2/2004 | Lee | 439/165 |
| 6,742,221 B2 * | 6/2004 | Lu et al. | 16/367 |
| 6,785,935 B2 | 9/2004 | Ahn et al. | |
| 6,867,961 B2 * | 3/2005 | Choi | 361/681 |
| 7,013,532 B2 * | 3/2006 | Lu et al. | 16/337 |
| 7,047,598 B2 * | 5/2006 | Huang | 16/312 |
| 7,067,837 B2 * | 6/2006 | Hwang et al. | 257/3 |
| 7,133,280 B2 * | 11/2006 | Love | 361/681 |
| 7,137,173 B2 * | 11/2006 | Sipple | 16/223 |
| 7,267,566 B2 * | 9/2007 | Ku et al. | 439/165 |
| 2002/0198006 A1 | 12/2002 | Hirayama et al. | |
| 2003/0075649 A1 * | 4/2003 | Jeong et al. | 248/157 |
| 2004/1121825 | 6/2004 | Ma et al. | |
| 2004/0198460 A1 | 10/2004 | Sakuta et al. | |
| 2004/0202316 A1 | 10/2004 | Kenjl et al. | |
| 2004/0203517 A1 | 10/2004 | Park et al. | |
| 2005/0125950 A1 * | 6/2005 | Su | 16/302 |
| 2005/0132536 A1 * | 6/2005 | Hashizume | 16/386 |
| 2005/0250560 A1 * | 11/2005 | Gupte et al. | 455/575.3 |
| 2005/0283945 A1 * | 12/2005 | Pan | 16/221 |
| 2006/0042044 A1 * | 3/2006 | Hwang et al. | 16/22 |
| 2006/0059659 A1 * | 3/2006 | Kim et al. | 16/330 |

OTHER PUBLICATIONS

Sony Ericsson Mobile Communications AB, International Application No. PCT/US05/028600, International Search Report, Dec. 8, 2005.

* cited by examiner

HINGE

CROSS-REFERENCES

This application is related to U.S. provisional application No. 60/593,267, filed Dec. 30, 2004, entitled "Hinge", naming Kevin J. Schoolcraft and Daniel J. Van Epps, Jr., as the inventors. The contents of the provisional application are incorporated here by reference in their entirety, and the benefit of the filing date of the provisional application is hereby claimed for all purposes that are legally served by such claim for the benefit of the filing date.

BACKGROUND

This invention relates generally to a mobile communication device, and more particularly to a mobile terminal used in a wireless communication system wherein the mobile terminal includes two body portions which are relatively rotatable and a hinge for connecting the two body portions of the mobile terminal.

A mobile terminal is used for sending and receiving information in a wireless communication system, such as a mobile telephone in a cellular telephone system. A mobile telephone typically includes a display and input mechanisms, such as keypads, buttons, and the like, which are used to control the mobile telephone. The display is used for viewing information and the input mechanisms typically provide for data entry, as well as control of any multi-media interface including the display.

A mobile terminal may be adapted to fold in order make the mobile terminal more compact when not in use. One type of folding mobile terminal is sometimes referred to as a "flip phone", wherein the housing of the mobile telephone includes two body portions pivotally joined at one end such that one body portion serves as a "flip" cover. In this arrangement, the body portions of the housing are moveable between an open position and a closed position. In the open position, the display and a keypad are visible and accessible. In the closed position, the display and keypad are substantially concealed.

Another type of folding mobile telephone is sometimes referred to as a "jackknife phone". A jackknife phone has a housing including two body portions joined at their ends which pivot about an axis perpendicular to the longitudinal plane of the housing. This configuration has the advantage of allowing for the display to always be on the outside of the mobile telephone. However, the mechanical and electrical connections between the body portions is complex. Specifically, the wiring and connectors for several dozen small wires electrically connecting the electronic components in the two body portions must pass through a mechanical hinge joining the body portions. Because of the small size of the hinge, a plurality of smaller connectors are used. Flat flexible cable is difficult to use in this application because bending of the flat cable can lead to damage.

For the foregoing reasons, there is a need for a mobile terminal for use in a wireless communication system which functions as a jackknife phone and is adapted to allow efficient assembly and electrical connection of the component parts of the mobile terminal.

SUMMARY

According to the present invention, a hinge is provided for use in a mobile terminal including at least two body portions. The hinge comprises a first hinge portion defining an opening and having a slot extending from the periphery of the first hinge portion to the opening, and a second hinge portion defining an opening and having a slot extending from the periphery of the second hinge portion to the opening. The first hinge portion is adapted to be secured to one of the two body portions, and the second hinge portion is adapted to be secured to the other of the two body portions. The first hinge portion and the second hinge portion are rotatably connected such that the openings are aligned. The first and second hinge portions are relatively rotatable between a first position where the slot in the first hinge portion and the slot in the second hinge portion are aligned for allowing access to the openings of the first and second hinge portions from the exterior of the hinge, and a second position where the slot in the first hinge portion and the slot in the second hinge portion are not aligned and the openings of the first and second hinge portions cannot be accessed from the exterior of the hinge.

Also according to the present invention, a mobile is provided and comprises a first housing member, a second housing member, and first and second hinge portions each defining an opening and having a slot extending from their periphery to the openings. The second hinge portion is rotatably connected to the first hinge portion such that the openings are aligned. The first and second hinge portions are relatively rotatable between a first position where the slot in the first hinge portion and the slot in the second hinge portion are aligned for allowing access to the openings of the first and second hinge portions from the exterior of the hinge, and a second position where the slot in the first hinge portion and the slot in the second hinge portion are not aligned and the openings of the first and second hinge portions cannot be accessed from the exterior of the hinge. The first hinge portion is secured to the first housing member the second hinge portion is secured to the second housing member such that the housing members are rotatable about an axis transverse to the longitudinal axis of the housing.

Further according to the present invention, a method is provided for connecting a first housing member of a mobile terminal and a second housing member of the mobile terminal such that the first and second housing members are rotatable an axis transverse to the longitudinal axis of the housing members. The method comprises the steps of providing a hinge including a first hinge portion defining an opening and having a slot extending from the periphery of the first hinge portion to the opening, and a second hinge portion defining an opening and having a slot extending from the periphery of the second hinge portion to the opening. The second hinge portion is rotatably connected to the first hinge portion such that the openings are aligned. Next, the relative position of the first hinge portion and the second hinge portion is selected such that the slot in the first hinge portion and the slot in the second hinge portion are aligned for allowing access to the openings of the first and second hinge portions from the exterior of the hinge. An electrical connector is disposed into the openings through the slots in the first hinge portion and the second hinge portion, and the first hinge portion rotated relative to the second hinge portion such that the slot in the first hinge portion and the slot in the second hinge portion are not aligned for capturing the electrical connector in the hinge. The first hinge portion is secured to the first housing member, and the second hinge portion is secured to the second housing member.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

As used herein, the term "keypad" is used to mean any type of input device including a touch sensitive area or areas, which may include predefined key positions or a gesture area. Further, the term "keypad" is not intended to be limited to a keypad based on contacting switch technology. Rather, "keypad" as contemplated by this disclosure is intended to refer to any type of input technology that might be referred to as such, including a non-contacting type more typically referred to as a "touchpad" in which the proximity of conductive bodies is sensed.

Figure 1:
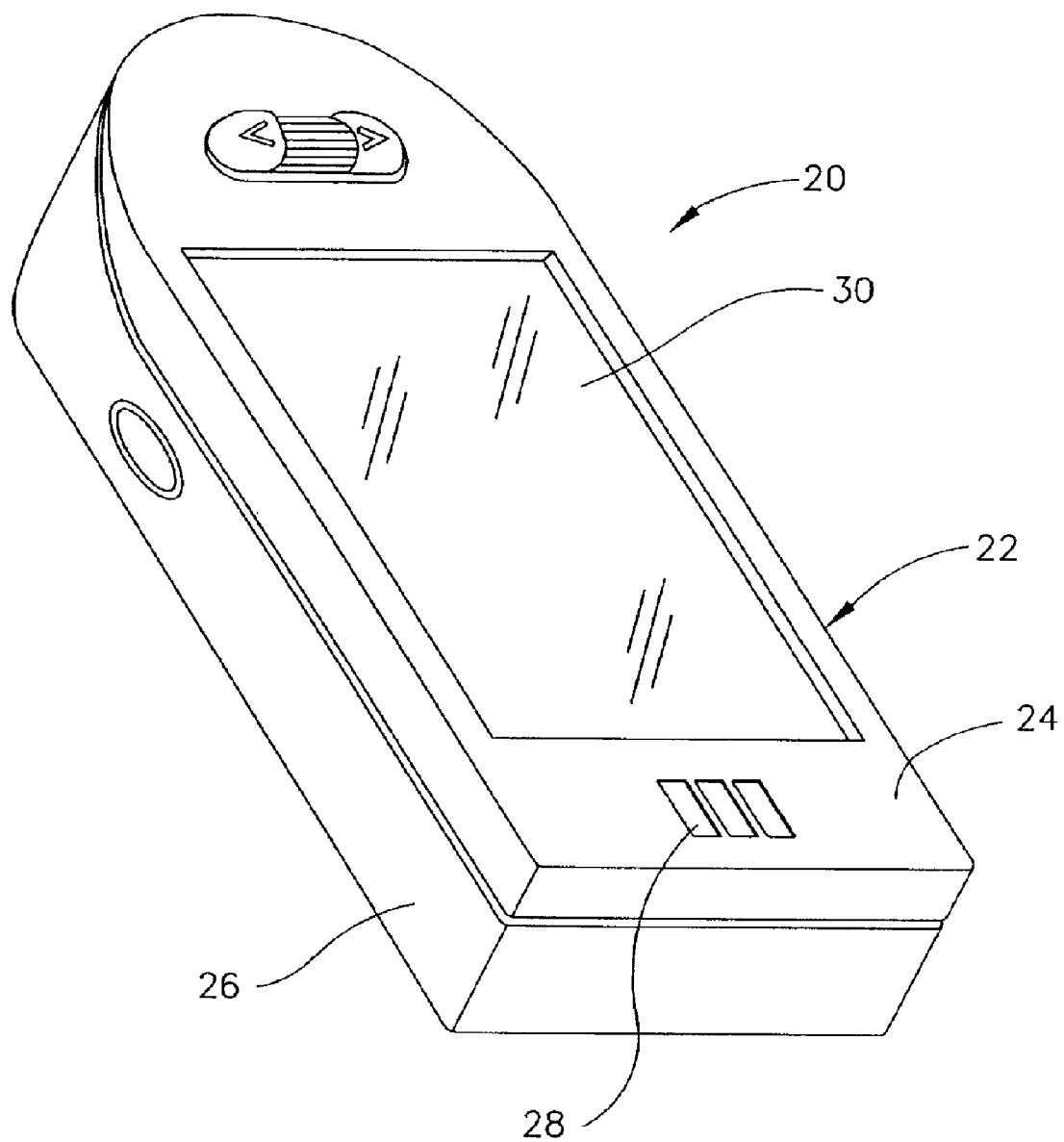
FIG. 1 is a front perspective view of an embodiment of a mobile terminal according to the present invention in a folded position.
Figure 2:
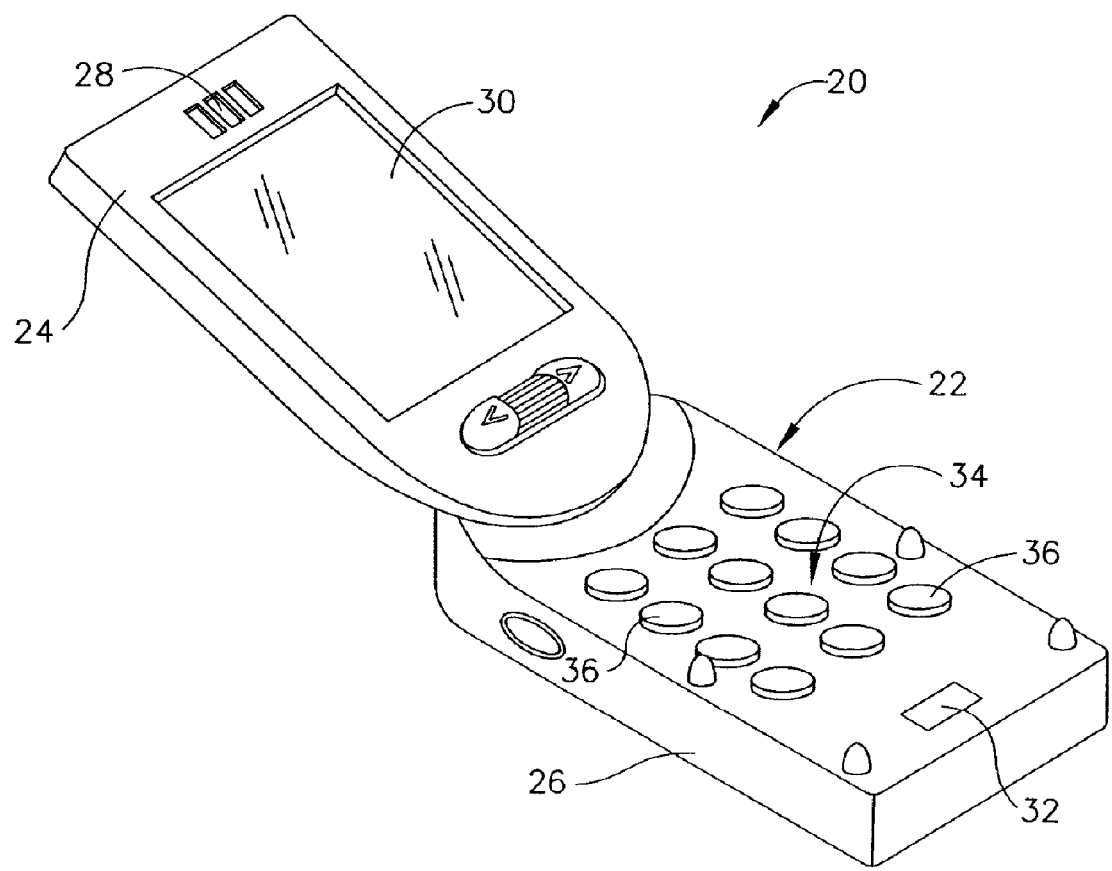
FIG. 2 is a front perspective view of the mobile terminal shown in FIG. 1 with the mobile terminal in an open position.
Figure 3:
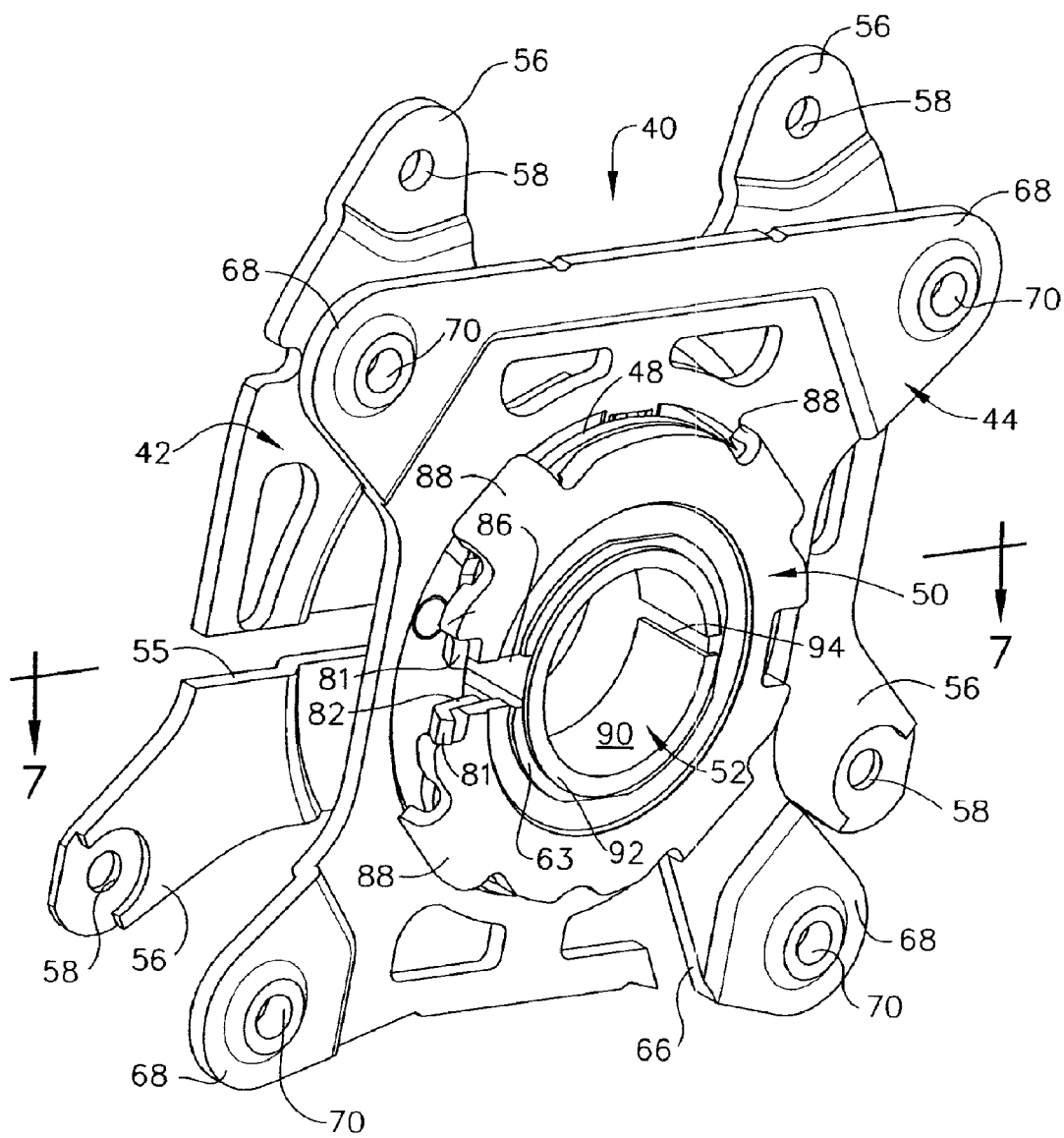
FIG. 3 is a front perspective of an embodiment of a hinge for use with a mobile terminal according to the present invention.
Figure 4:
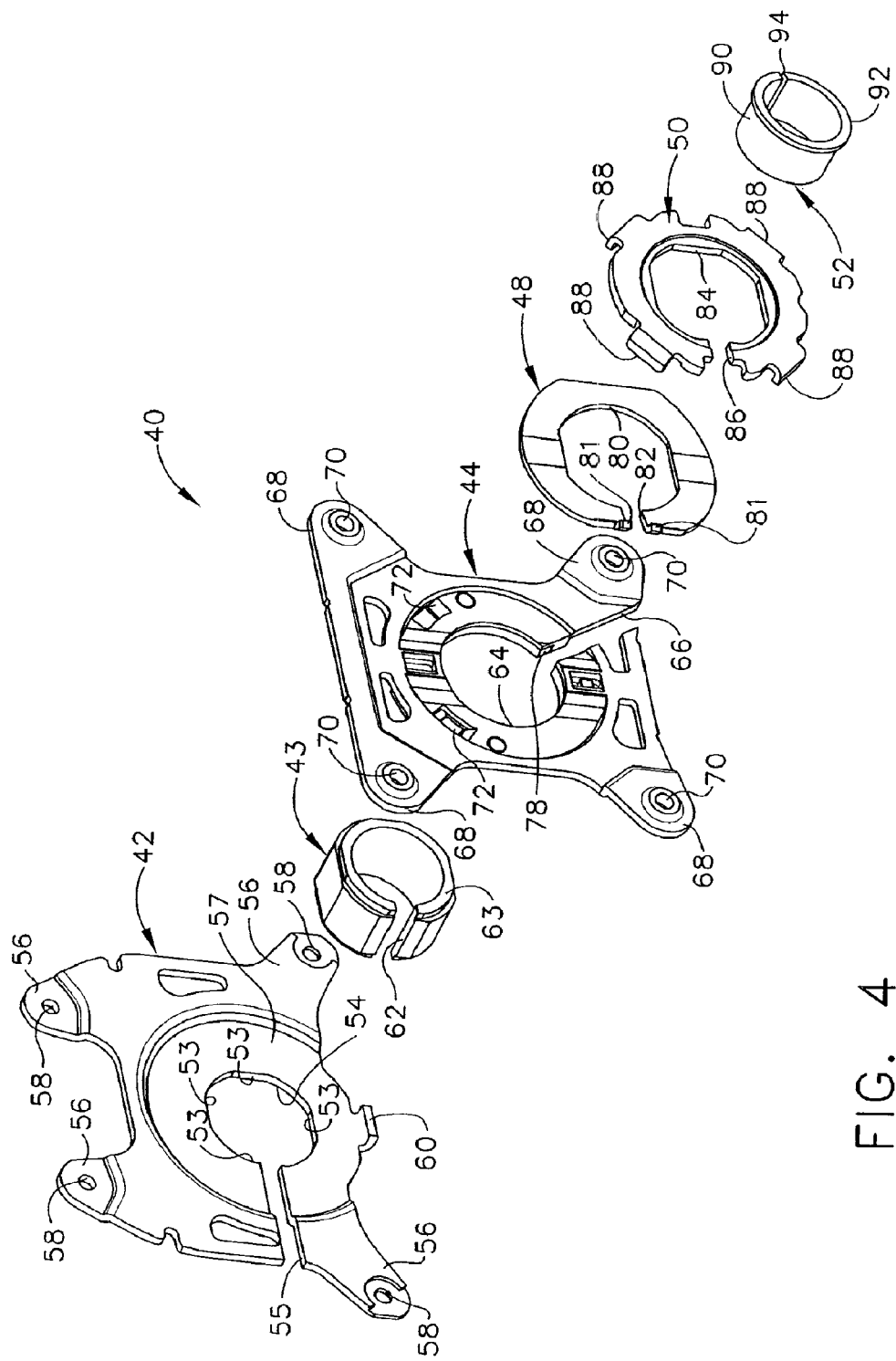
FIG. 4 is a front perspective exploded view of the hinge as shown in FIG. 3.
Figure 5:
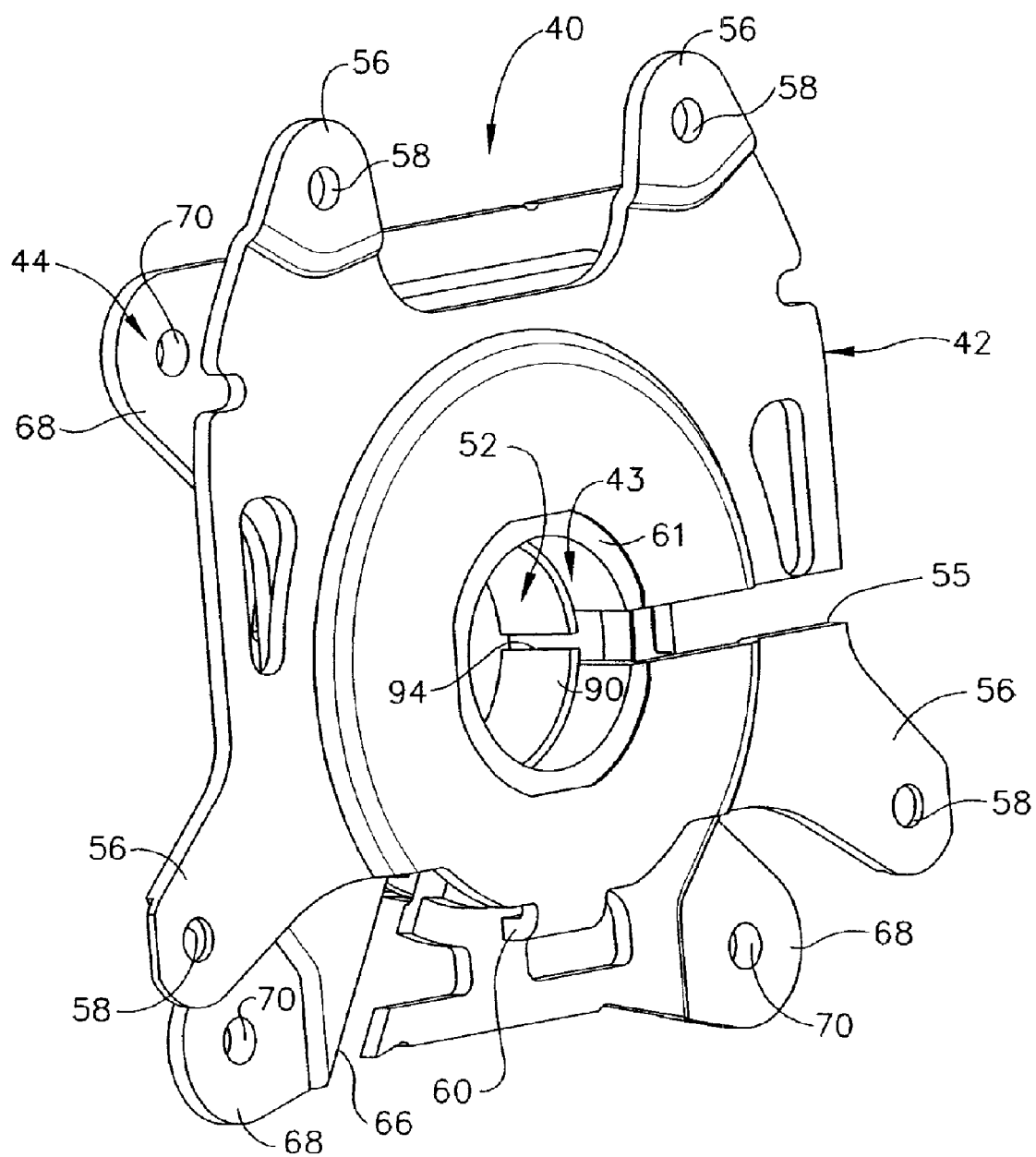
FIG. 5 is a rear perspective view of the hinge as shown in FIG. 3.
Figure 6:
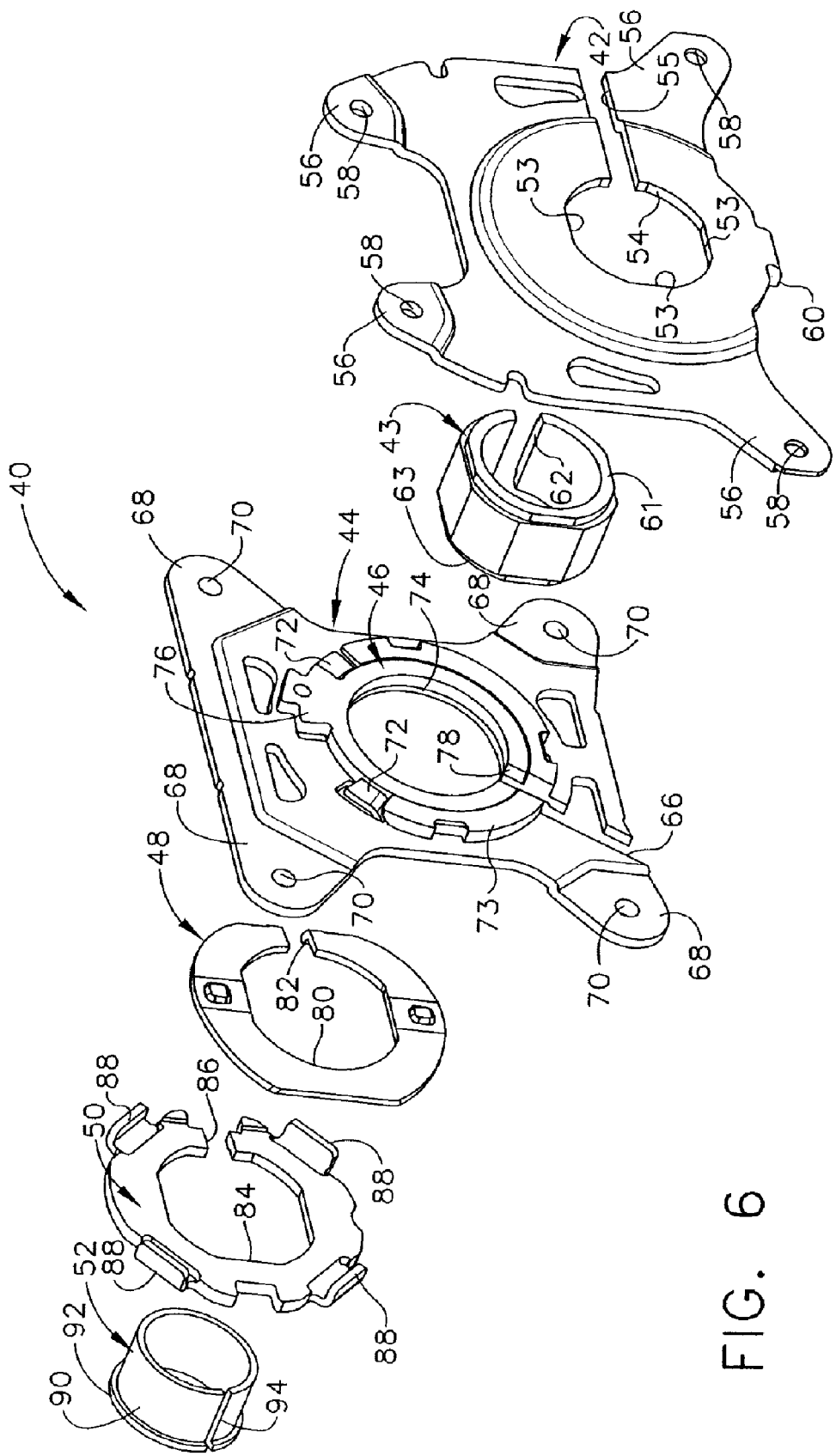
FIG. 6 is a rear perspective exploded view of the hinge as shown in FIG. 5.
Figure 7:
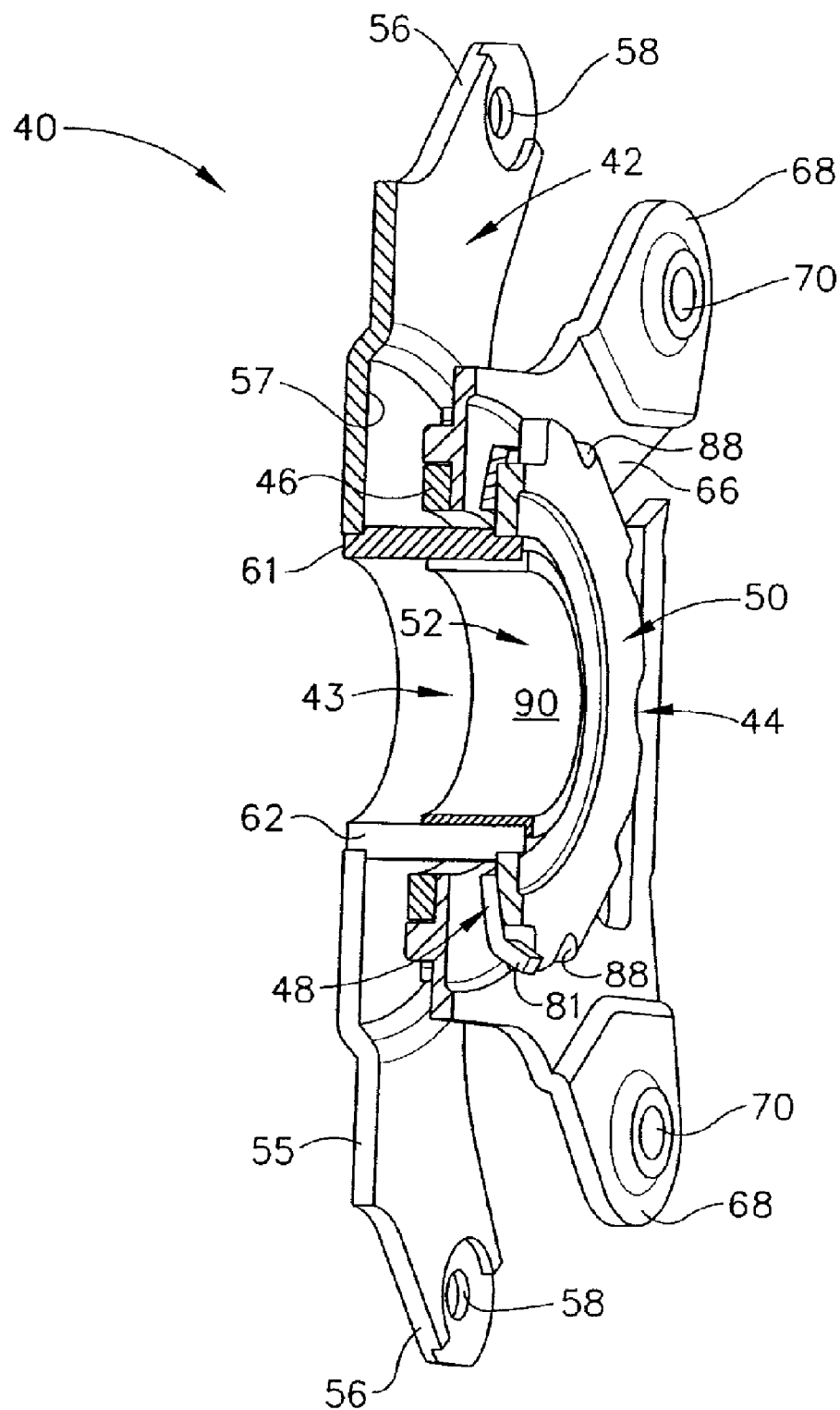
FIG. 7 is a cross-section view of the hinge as shown in FIG. 3 taken along line 7-7 of FIG. 3.

Referring now to the drawings, wherein like reference numerals designate corresponding or similar elements throughout the several views, a mobile terminal according to the present invention is shown in FIGS. 1 and 2 and generally designated at 20. The mobile terminal 20 is adapted for use in a wireless communication network and, in the embodiment shown, the mobile terminal 20 is a cellular telephone, which may be conventional except as otherwise provided in this description. The mobile terminal 20 comprises a housing 22 which may be of any desired size and shape; however, as described above, the trend is toward a smaller mobile terminal 20. The housing 22 contains electronic components that are operable to transmit and receive telecommunication signals, as is known in the art, and for operating other functions of the mobile terminal 20.

Referring to FIGS. 1 and 2, the housing 22 includes an upper portion 24 and a lower portion 26. The upper portion 24 of the housing 22 includes an ear piece 28, or speaker, for emitting sound and a display 30 for displaying alphanumeric text and graphics and other images. The lower portion 26 of the housing 22 includes a microphone 32 for inputting sound and a keypad apparatus 34 including alphanumeric and function keys 36 that can receive tactile input. The upper portion 24 and the lower portion 26 of the housing 22 are electrically connected so that the user can use the keypad 34 for tactile input to enter data, make telephone calls, interact with an image on the display 30, or otherwise control operation of the mobile terminal 20. Various other controls may also be provided on the housing 22, such as special purpose keys (not shown) that control one or more functional aspects of the mobile terminal 20. For example, in a mobile terminal 20 including a camera function, one of the special purpose keys can act as a shutter release button. Because there are many types of mobile terminal housings 22 and associated components that are well known in the art and that may be utilized to practice the present invention, a more detailed description of these components is not required. It is understood that the present invention is not directed to any particular style of housing.

The upper portion 24 and the lower portion 26 of the housing 22 are joined adjacent their ends such that the upper portion 24 and the lower portion 26 are relatively rotatable in a horizontal plane through a possible range of up to about 360°. In this configuration, the housing 22 functions as a "jackknife phone", wherein the upper portion 24 and the lower portion 26 of the housing 22 are moveable between a closed position, shown in FIG. 1, and an open position shown in FIG. 2. In the closed position, the inner surface of the upper portion 24 of the housing 22 is in close and complementary registration with the inner surface of the lower portion 26 of the housing 22 such that the keypad 34 is substantially concealed. Because the display 30 is coincident with the outer surface of the upper portion 24 of the housing 22, the display 30 is visible whether the mobile terminal 20 is in the closed or the open position. In the open position, both the display 30 and the keypad 34 are visible and accessible to a user.

An embodiment of a hinge assembly for use with a mobile terminal 20 according to the present invention is shown in FIGS. 3-7 and generally designated at 40. The hinge assembly 40 comprises a base plate 42, a spacer 43, a pivot plate 44, a key ring 46, a wave spring 48, a retainer 50 and a split grommet 52.

The base plate 42 is a generally rectangular plate and defines a central opening 54 having opposed linear edges 53. The opening 54 is centered in a recess 57 formed in the inner surface of the base plate 42. A linear slot 55 extends from the periphery of the base plate 42 and opens into the central opening 54. A plurality of mounting ears 56 are spaced around the periphery of the base plate 42. In the embodiment shown in the FIGs., four mounting ears 56 are located at the corners of the base plate 42. Each of the mounting ears 56 has a mounting hole 58 for receiving a threaded fastener (not shown). A detent 60 integral with the periphery of the base plate 42 extends inwardly from between the lower mounting ears 56.

The spacer 43 is a hollow, generally cylindrical element having a linear longitudinal slot 62 along one side. Lips 61, 63 extend axially from each end of the spacer 43. The cross-section of the lip 61 at the inner end of the spacer 43 corresponds to the shape of the central opening 54 in the base plate 42. The inner end lip 61 of the spacer 43 is non-rotatably fixed in the central opening 54 of the base plate 42 by swaging, press fit, or other suitable means, such that the slot 62 in the spacer 43 is aligned with the slot 55 in the base plate 42. The spacer 43 projects inwardly from the base plate 42.

The pivot plate 44 is also a generally rectangular plate and defines a central circular opening 64 for rotatably receiving the spacer 43. A linear slot 66 extends from the periphery of the pivot plate 44 and opens into the central opening 64. A plurality of mounting ears 68 are spaced around the periphery of the pivot plate 44. In the embodiment shown, four mounting ears 68 are located at the corners of the pivot plate 44. Each of the mounting ears 68 has a mounting hole 70 for receiving a threaded fastener (not shown). Two inwardly projecting tangs 72 are punched into the pivot plate 44 at circumferentially spaced locations adjacent to the central opening 64.

The key ring 46 is a circular member and defines a central circular opening 74 for rotatably receiving the spacer 43. The key ring 46 has a slot 78 that opens into the circular opening 74. A bell-shaped projection 76 radially extends from the periphery of the key ring 46. The key ring 46 slidingly fits in a fence 73 on the inner surface of the pivot plate 44 such that the projection 76 on the key ring 46 is free to rotate between the tangs 72.

The wave spring 48 is a thin C-shaped member and has curved bends at opposed points to impart elasticity to the spring 48. The wave spring 48 defines a central opening 80 that corresponds to the exterior surface of the spacer 43 for non-rotatably receiving the spacer 43. The ends 83 of the wave spring 48 include outturned flanges 81. When joined, a gap 82 defined between the ends 83 of the wave spring 48 is aligned with the slots 55, 62 in the spacer 43 and the base plate 42.

The retainer 50 is a circular member and defines a central opening 84. A slot 86 in the retainer 50 opens into the central opening 84. The cross-section of the lip 63 at the outer end of the spacer 43 corresponds to the shape of the central opening 84 in the base plate 50. The outer end lip 63 of the spacer 43 is non-rotatably fixed in the central opening 84 of the retainer 50 by swaging, press fit, or other suitable means, such that the slot 86 in the retainer 50 is aligned with the slot 62 in the spacer 43, and thus the gap 82 in the wave spring 48 and the slot 55 in the base plate 42. It is understood, therefore, that the base plate 42, the spacer 43, the wave spring 48 and the retainer 50 rotate together relative to the pivot plate 44 and the key ring 46, with the slots 55, 62, 86 in the base plate 42, the spacer 43, and the retainer 50 and the gap 82 in the wave spring 48 permanently aligned. The retainer 50 includes a plurality of circumferentially spaced, inwardly projecting flanges 88 around the periphery of the retainer 50 for receiving the wave spring 48. A portion of the periphery of the retainer 50 is removed from each side of the slot 86 for receiving the flanges 81 on the ends 82 of the wave spring 48.

The wave spring 48 is disposed between the pivot plate 44 and the retainer 50. The wave spring 48 exerts an elastic force in a longitudinal direction on the pivot plate 44 for biasing the pivot plate 44 into the base plate 42 such that the fence 73 and the key ring 46 are slidingly received in the recess 57 in the base plate 42. The wave spring 48 functions to generate friction against the pivot plate 44 for providing some resistance to movement as the hinge 40 is rotated.

The split grommet 52 is a hollow cylindrical element and is preferably formed from rubber. The grommet 52 includes a body portion 90 having a radial flange 92 at one end and a linear longitudinal slot 94 along one side. As seen in the FIGs., the grommet 52 is received in the spacer 43 such that the flange 92 engages against the outer lip 63 of the spacer 43.

Although not shown in the FIGs., it is understood that the upper portion 24 and the lower portion 26 of the housing 22 each have various electric circuits therein. For example, the upper portion 24 may be equipped with circuitry for operation of the display 30, the speaker 28 and the like, and the lower portion 26 may be equipped with a main board having circuitry for operation of the mobile terminal 20. Electrical wires, or a flexible printed circuit, used for connecting the electric circuitry in the upper portion 24 with the electric circuitry in the lower portion 26 of the housing 22 pass between the housing portions via through-holes at the point of connection of the hinge 40 to the housing 22, as is known in the art. The electrical wires and flexible printed circuit are not shown to add clarity to the FIGs.

Figure 8:
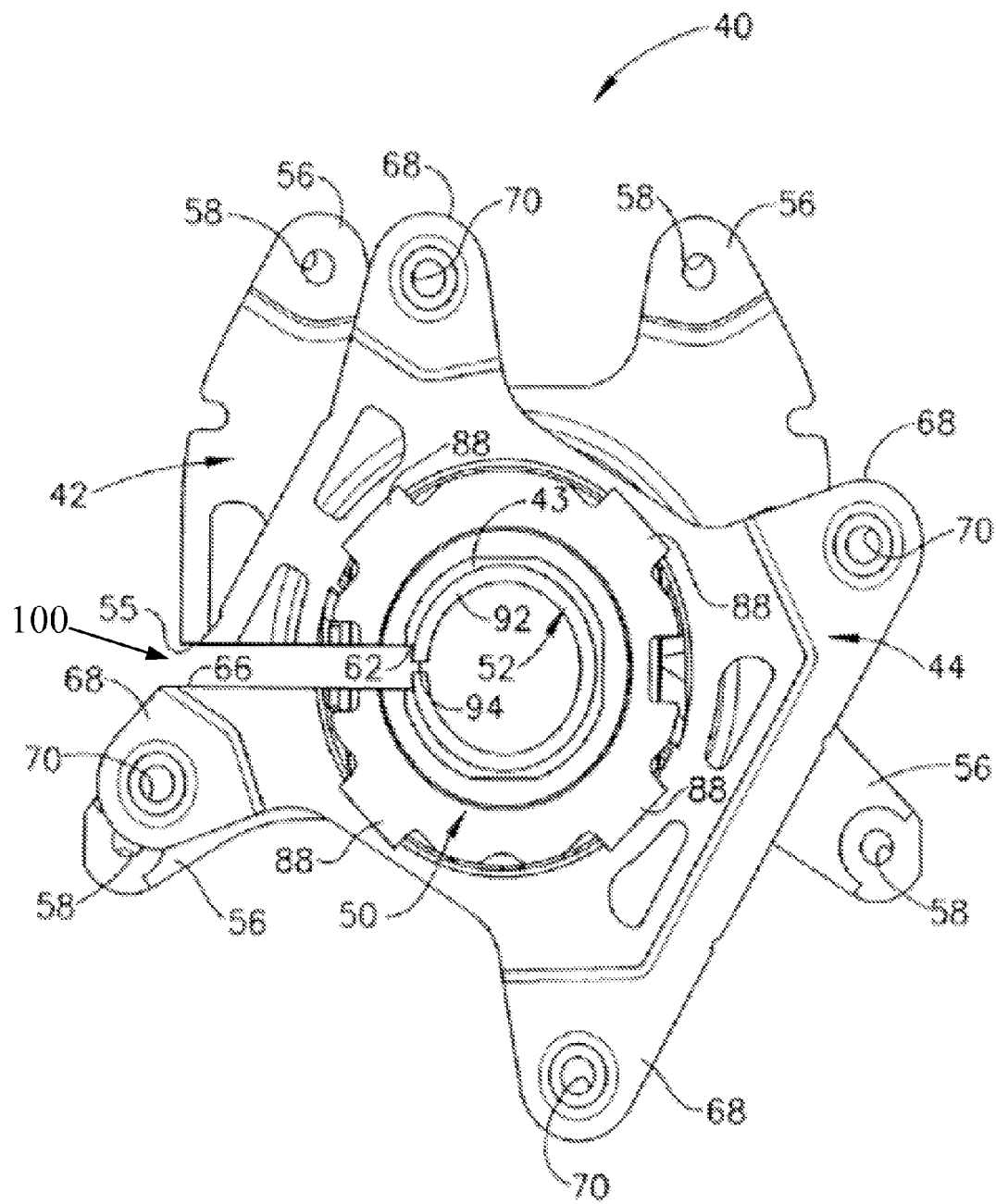
FIG. 8 is a front elevation view of the hinge as shown in FIG. 3 in a first position with the slots of parts comprising the hinge aligned.
Figure 9:
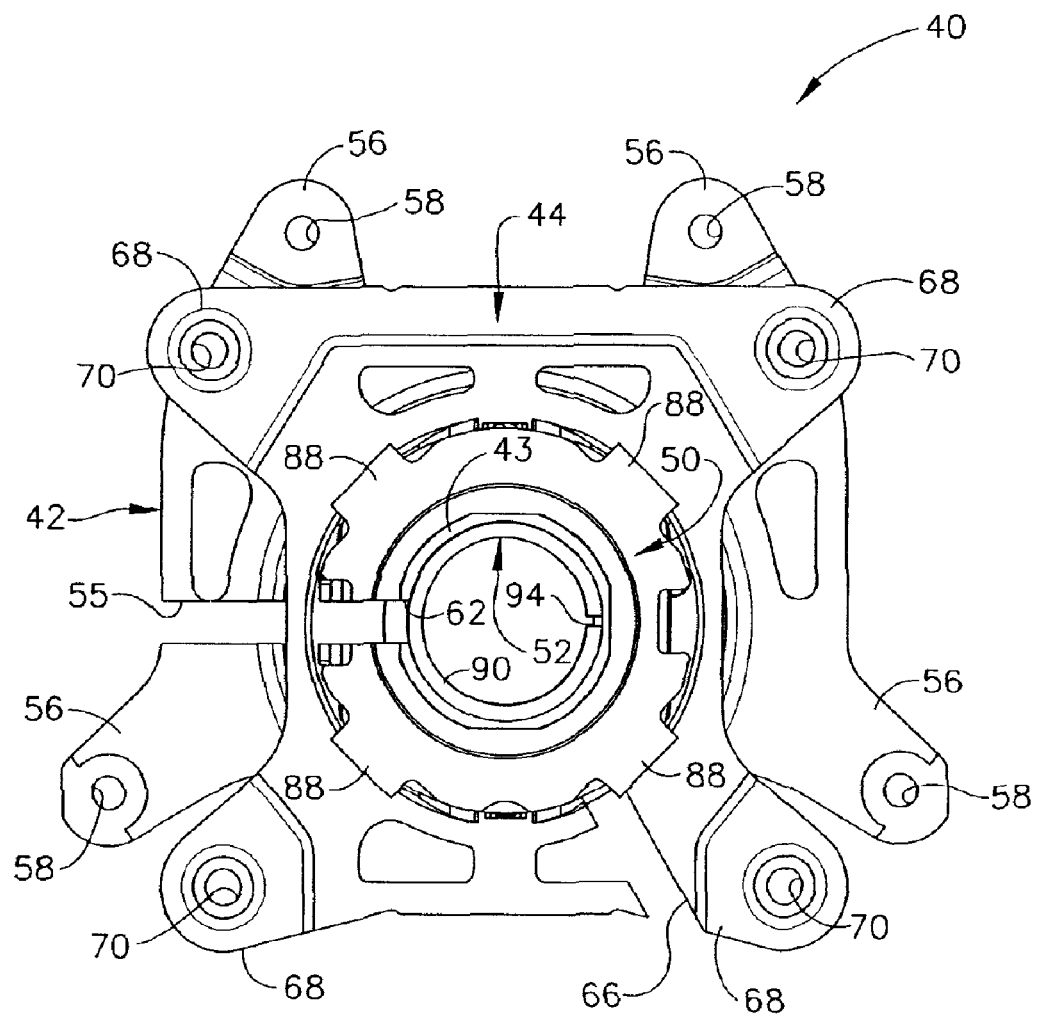
FIG. 9 is a front elevation view of the hinge as shown in FIG. 8 in a second position.

Referring to FIG. 8, during assembly of the mobile terminal 20, the pivot plate 44 and key ring 46 are rotated relative to the other parts comprising the hinge assembly 40 for aligning the slot 66 in the pivot plate 44 with the slot 55 in the base plate 42. As described above, the slot 55 in the base plate 42 is permanently aligned with the slot 62 in the spacer 43, the gap 82 in the wave spring 48 and the slot 86 in the retainer 50. Thus, as seen in FIG. 8, a passage 100 is created from the periphery of the hinge assembly 40 to the central opening through the hinge 40 as defined by the interior of the spacer 43. It is understood that the grommet 52 is similarly rotated such that the slot 94 is also aligned with the passage 100. This allows the user to slip the electrical wires or flexible printed circuit into the central opening of the hinge assembly 40. The pivot plate 44 and the key ring 46 are then rotated relative to the other parts comprising the hinge assembly 40 until the hinge assembly is in the position shown in FIG. 9, thereby capturing the wires or printed circuit in the spacer 43 in the hinge assembly 40. The grommet 52 may then be rotated relative to the spacer 43 to misalign the slit in the grommet 52 and the slot 55 in the base plate 42. It is understood that the grommet 52 rotates freely in the spacer 43 and thus functions to hold the wires in the hinge assembly 40 even if the hinge assembly 40 is again rotated to the FIG. 9 position.

Figure 10:
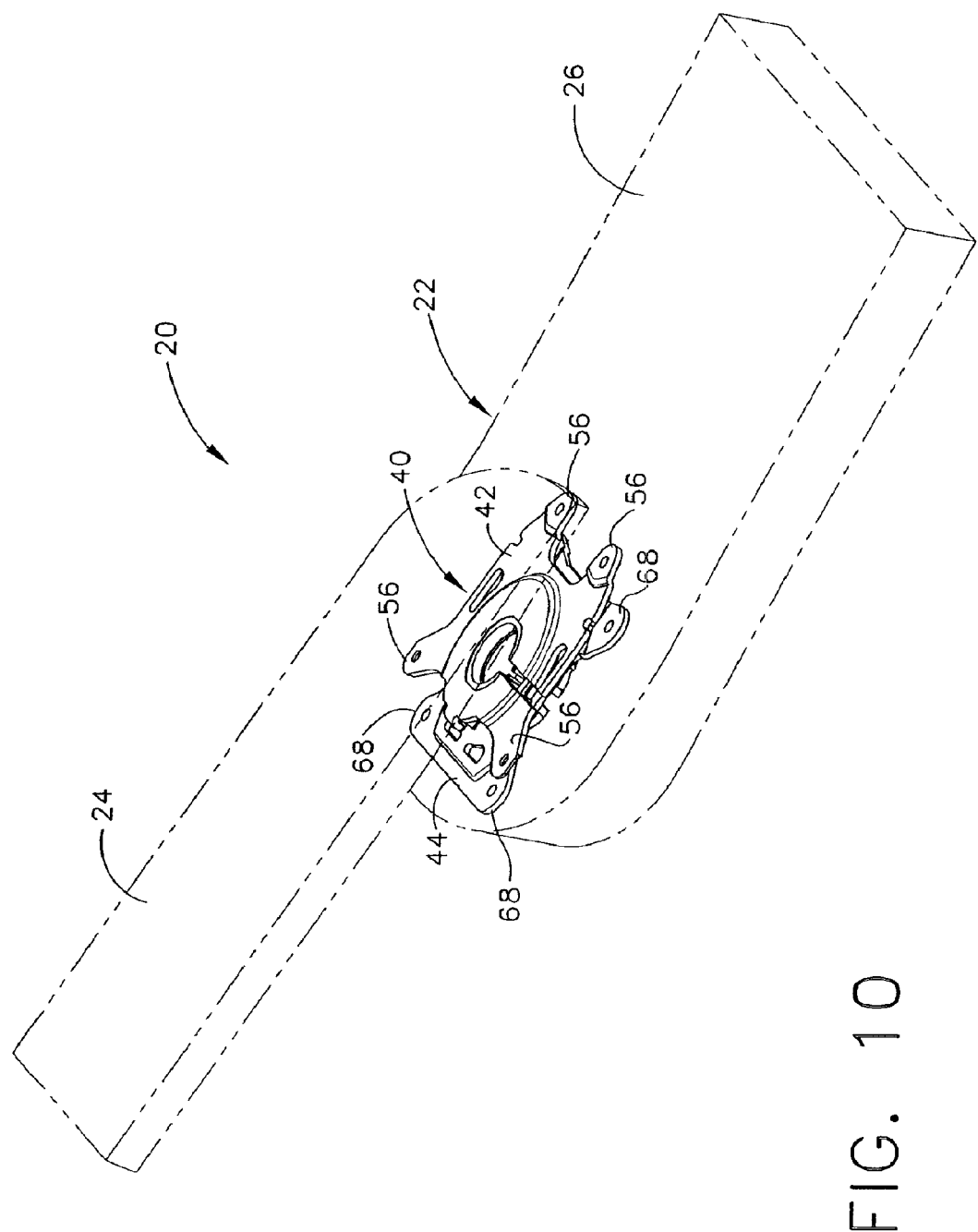
FIG. 10 is a perspective view of the hinge as shown in FIG. 3 in place on a housing of a mobile terminal shown in phantom.
Figure 11:
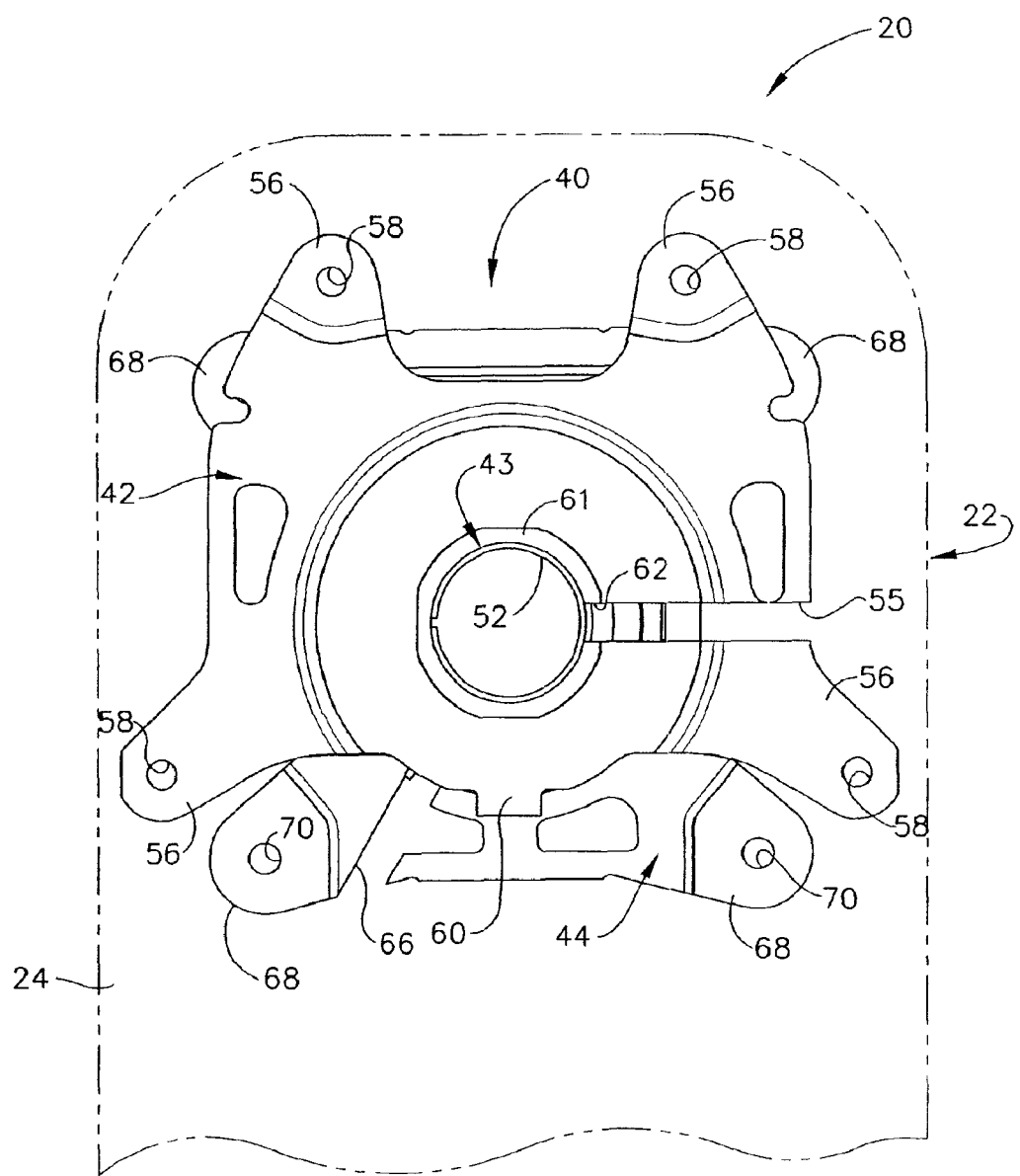
FIG. 11 is a front elevation view of the hinge as shown in FIG. 3 in a position on a mobile terminal shown in phantom and corresponding to the folded position of the mobile terminal as shown in FIG. 1.
Figure 12:
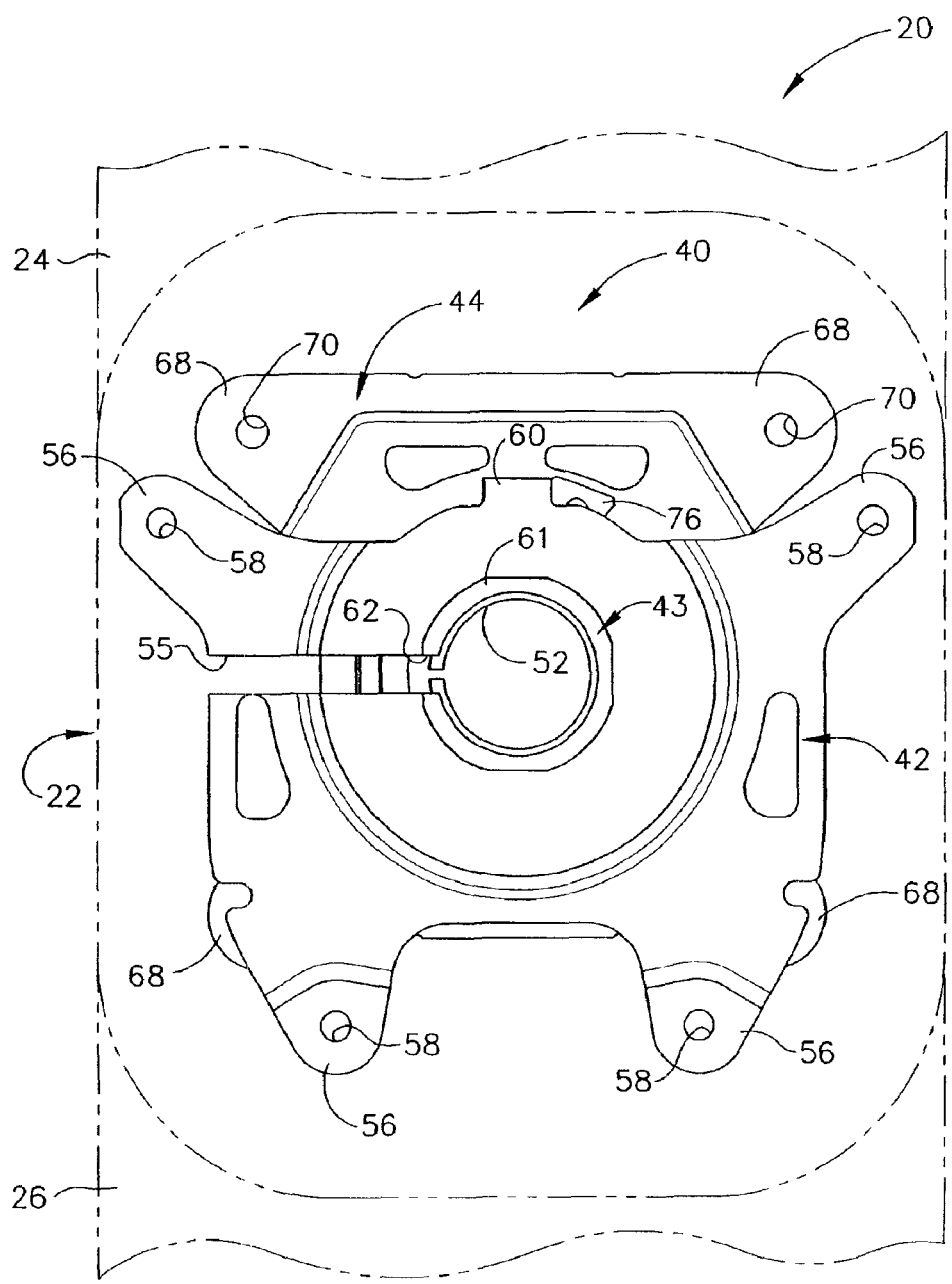
FIG. 12 is a front elevation view of the hinge as shown in FIG. 3 in a position on a mobile terminal shown in phantom and corresponding to the open position of the mobile terminal as shown in FIG. 2.

The hinge assembly 40 is then installed on the mobile terminal 20. Referring to FIG. 10, the base plate 42 is secured to the upper portion 24 of the housing 22 such that the opening through the hinge 40 aligns with the through-hole in the upper portion 24. The pivot plate 44 is secured to the lower portion 26 of the housing 22 such that the opening through the hinge 40 aligns with the through-hole in the lower portion 26. In one embodiment, the pivot plate 44 fits in a corresponding recess which may be provided on outer surface of the lower portion 26 of the housing 22. When installed, the hinge assembly 40 allows the housing portions 24, 26 to be relatively slidingly rotated between the closed position (FIG. 11) and the open position (FIG. 12). From the closed position, the housing portions 24, 26 may be rotated in either direction to the open position. Depending on the direction of rotation, there may be some lost motion between the pivot plate 44 and the key ring 46. When one of the tangs 72 engages the projection 76 on the key ring 46, the pivot plate 44 and the key ring 46 rotate together until the projection 76 engages the detent 60 on the base plate, which is at the open position of the mobile terminal 20. The key ring 46 and the detent 60 function as a stopper for restricting the range of rotation of the housing portions 24, 26 to 180° in either direction. The cylindrical central opening through the spacer 43 prevents twisting of the wires or flexible circuit.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, a hinge according to the present invention is suitable for use in a number of portable and non-portable electronics devices and applications. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

What is claimed is:

1. A hinge for use in a mobile terminal including at least two body portions each having an inner major surface and an opposed outer major surface, the hinge pivotally connecting the two body portions for movement between an open position of the mobile terminal where the inner major surfaces of the body portions are spaced from one another and a closed position of the mobile terminal where the inner major surfaces of the body portions are proximate one another, the hinge comprising:
   a first hinge portion defining an opening and comprising a hollow hub which at least partially defines the opening in the first hinge portion, the first hinge portion having a periphery and a slot extending from the periphery of the first hinge portion to the opening, the first hinge portion is adapted to be secured to one of the at least two body portions, wherein the hub has a length and a longitudinal slot extending the length of the hub and substantially aligned with the slot extending from the periphery of the first hinge portion for allowing access to the opening in the first hinge portion;
   a second hinge portion defining an opening and having a periphery and a slot extending from the periphery of the second hinge portion to the opening, the second hinge portion adapted to be secured to the other of the at least two body portions;
   a retainer non-rotatably mounted to the hub and defining a slot aligned with the hub, the second hinge portion being disposed between the retainer and the first hinge portion; and
   a wave spring disposed between the retainer and the second hinge portion for biasing the second hinge portion along the hub toward the first hinge portion, the wave spring defining a gap aligned with the slot of the hub; and
   wherein the first hinge portion and the second hinge portion are rotatably connected such that the openings of the first and second hinge portions are aligned, the first and second hinge portions relatively rotatable between a first position where the slot in the first hinge portion and the slot in the second hinge portion are aligned for allowing access to the openings of the first and second hinge portions from an exterior of the hinge, a second position where the slot in the first hinge portion and the slot in the second hinge portion are not aligned and the openings of the first and second hinge portions cannot be accessed from the exterior of the hinge, and a third position where the slot in the first hinge portion and the slot in the second hinge portion are not aligned and the openings of the first and second hinge portions cannot be accessed from the exterior of the hinge, wherein the second position and the third position correspond to an open position and a closed position, respectively, of the mobile terminal.

2. A hinge as recited in claim 1, wherein the hub is rotatably received in the opening in the second hinge portion such that the hub at least partially defines an interior cavity of the hinge.

3. A hinge as recited in claim 2, wherein the hub is cylindrical.

4. A hinge as recited device in claim 1, wherein the wave spring is a spring washer non-rotatably coupled to the hub, the spring washer having a gap aligned with the slot in the hub.

5. A hinge for use in a mobile terminal including at least two body portions each having an inner major surface and an opposed outer major surface, the hinge pivotally connecting the two body portions for movement between an open position of the mobile terminal where the inner major surfaces of the body portions are spaced from one another and a closed position of the mobile terminal where the inner major surfaces of the body portions are proximate one another, the hinge comprising:
   a first hinge portion defining an opening and having a periphery and a slot extending from the periphery of the first hinge portion to the opening, the first hinge portion comprising a hub having an opening which at least partially defines the opening in the first hinge portion, wherein the first hinge portion is adapted to be secured to one of the at least two body portions, wherein the hub has a slot substantially aligned with the slot extending from the periphery of the first hinge portion for allowing access to the opening in the first hinge portion;
   a second hinge portion defining an opening and having a periphery and a slot extending from the periphery of the second hinge portion to the opening in the second hinge portion, the second hinge portion adapted to be secured to the other of the at least two body portions, wherein the hub is rotatably received in the opening in the second hinge portion such that the openings of the first and second hinge portions are aligned and the hub at least partially defines an interior cavity of the hinge, the first and second hinge portions relatively rotatable between a first position where the slot in the first hinge portion and the slot in the second hinge portion are aligned for allowing access to the openings of the first and second hinge portions from an exterior of the hinge, and a second position where the slot in the first hinge portion and the slot in the second hinge portion are not aligned and the openings of the first and second hinge portions cannot be accessed from the exterior of the hinge;
   a retainer non-rotatably mounted to the hub and defining a slot aligned with the hub, the second hinge portion being disposed between the retainer and the first hinge portion;
   a wave spring disposed between the retainer and the second hinge portion for biasing the second hinge portion along the hub toward the first hinge portion, the wave spring defining a gap aligned with the slot of the hub, and
   a grommet rotatably disposed in the hub, the grommet having a length and a longitudinal slot extending the length of the grommet, the grommet rotatable within the hub between a first position where the slot in the grommet and the slots in the first hinge portion and the second hinge portion are aligned for allowing access to the interior cavity of the hinge, and a second position where the slot in the grommet and the slots in the first hinge portion and the second hinge portion are not aligned and the interior cavity of the hinge cannot be accessed from the exterior of the hinge.

6. A hinge as recited in claim 1, wherein the first hinge portion is rotated in a range of from about 0 degrees to about 360 degrees with respect to the second hinge portion.

7. A hinge as recited in claim 6, wherein each of the first hinge portion and the second hinge portion each comprise a protrusion, the protrusions contacting at a relative position of the hinge portions for restricting the range of relative rotation of the hinge portions to less than about 360 degrees.

8. A hinge as recited in claim 7, wherein each protrusion extends transversely of a plane of each of the first hinge portion and the second hinge portion.

9. A hinge as recited in claim 7, wherein one of the protrusions extends transversely of the plane of either of the first hinge portion or the second hinge portion, and the other of the protrusions extends radially in the plane of the other of the first hinge portion or the second hinge portion.

10. A mobile terminal, comprising:
a first housing member having an inner major surface and an opposed outer major surface;
a second housing member having an inner major surface and an opposed outer major surface;
a first hinge portion defining an opening and having a periphery and a slot extending from the periphery of the first hinge portion to the opening, the first hinge portion comprising a hub which at least partially defines the opening in the first hinge portion, wherein the hub has a slot substantially aligned with the slot extending from the periphery of the first hinge portion for allowing access to the opening in the first hinge portion;
a second hinge portion defining an opening and having a periphery and a slot extending from the periphery of the second hinge portion to the opening of the second hinge portion, the second hinge portion rotatably connected to the first hinge portion such that the openings of the first and second hinge portions are aligned, the first and second hinge portions relatively rotatable between a first position where the slot in the first hinge portion and the slot in the second hinge portion are aligned for allowing access to the openings of the first and second hinge portions from an exterior of the hinge, a second position where the slot in the first hinge portion and the slot in the second hinge portion are not aligned and the openings of the first and second hinge portions cannot be accessed from the exterior of the hinge, and a third position where the slot in the first hinge portion and the slot in the second hinge portion are not aligned and the openings of the first and second hinge portions cannot be accessed from the exterior of the hinge;
a retainer non-rotatably mounted to the hub and defining a slot aligned with the hub, the second hinge portion being disposed between the retainer and the first hinge portion; and
a wave spring disposed between the retainer and the second hinge portion for biasing the second hinge portion along the hub toward the first hinge portion, the wave spring defining a gap aligned with the slot of the hub; and
wherein the first hinge portion is secured to the first housing member and the second hinge portion is secured to the second housing member such that the first and second housing members are rotatable about an axis transverse to the longitudinal axis of the first and second housing members, and wherein the second position and the third position correspond to an open position of the mobile terminal where the inner major surfaces of the first and second housing members are spaced from one another and a closed position of the mobile terminal where the inner major surfaces of the first and second housing members are proximate to one another.

11. A mobile terminal as recited in claim 10, wherein the hub is rotatably received in the opening in the second hinge portion such that the hub at least partially defines an interior cavity of the hinge.

12. A mobile terminal as recited in claim 11, wherein the hub is cylindrical.

13. A mobile terminal as recited in claim 10, wherein the wave spring is a spring washer non-rotatably coupled to the hub, the spring washer having a gap aligned with the slot in the hub.

14. A mobile terminal including at least two body portions each having an inner major surface and an opposed outer major surface, the hinge pivotally connecting the two body portions for movement between an open position of the mobile terminal where the inner major surfaces of the body portions are spaced from one another and a closed position of the mobile terminal where the inner major surfaces of the body portions are proximate one another, comprising:
a first housing member;
a second housing member;
a first hinge portion defining an opening and having a periphery and a slot extending from the periphery of the first hinge portion to the opening for allowing access to the opening in the first hinge portion, the first hinge portion comprising a hollow hub which at least partially defines the opening in the first hinge portion, wherein the hub has a slot substantially aligned with the slot extending from the periphery of the first hinge portion for allowing access to the opening in the first hinge portion;
a second hinge portion defining an opening and having a periphery and a slot extending from the periphery of the second hinge portion to the opening of the second hinge portion, wherein the hollow hub is rotatably received in the opening in the second hinge portion such that the openings of the first and second hinge portions are aligned and the hollow hub at least partially defines an interior cavity of the first and second hinge portions, the first and second hinge portions relatively rotatable between a first position where the slot in the first hinge portion and the slot in the second hinge portion are aligned for allowing access to the openings of the first and second hinge portions from an exterior of the hinge, a second position where the slot in the first hinge portion and the slot in the second hinge portion are not aligned and the openings of the first and second hinge portions cannot be accessed from the exterior of the hinge;
a retainer non-rotatably mounted to the hub and defining a slot aligned with the hub, the second hinge portion being disposed between the retainer and the first hinge portion; and
a wave spring disposed between the retainer and the second hinge portion for biasing the second hinge portion along the hub toward the first hinge portion, the wave spring defining a gap aligned with the slot of the hub;
wherein the first hinge portion is secured to the first housing member and wherein the second hinge portion is secured to the second housing member such that the first and second housing members are rotatable about an axis transverse to a longitudinal axis of the first and second housing members; and a grommet rotatably disposed in the hub, the grommet having a length and a longitudinal slot extending the length of the grommet, the grommet rotatable within the hub between a first position where the slot in the grommet and the slots in the first hinge portion and the second hinge portion are aligned for allowing access to the interior cavity of the hinge, and a second position where the slot in the grommet and the slot in the first hinge portion and the second hinge portion are not aligned and the interior cavity of the hinge cannot be accessed from the exterior of the hinge.

15. A mobile terminal as recited in claim 10, wherein the first hinge portion is rotated in a range of from about 0 degrees to about 360 degrees with respect to the second hinge portion.

16. A mobile terminal as recited in claim 15, wherein each of the first hinge portion and the second hinge portion each comprise a protrusion, the protrusions contacting at a relative position of the hinge portions for restricting the range of relative rotation of the hinge portions to less than about 360 degrees.

17. A mobile terminal as recited in claim 16, wherein each protrusion extends transversely of a plane of each of the first hinge portion and the second hinge portion.

18. A mobile terminal as recited in claim 16, wherein one of the protrusions extends transversely of the plane of either of the first hinge portion or the second hinge portion, and the other of the protrusions extends radially in the plane of the other of the first hinge portion or the second hinge portion.

19. A method for connecting a first housing member of a mobile terminal and a second housing member of the mobile terminal, each housing member having an inner major surface and an opposed outer major surface, such that the first and second housing members are rotatable on an axis transverse to a longitudinal axis of the first and second housing members between an open position of the mobile terminal where the inner major surfaces of the first and second housing members are spaced from one another and a closed position of the mobile terminal where the inner major surfaces of the first and second housing members are proximate one another, the method comprising:

providing a hinge including:
  a first hinge portion defining an opening and having a periphery and a slot extending from the periphery of the first hinge portion to the opening, the first hinge portion comprising a hollow hub which at least partially defines the opening in the first hinge portion, wherein the hub has a slot substantially aligned with the slot extending from the periphery of the first hinge portion for allowing access to the opening in the first hinge portion,
  a second hinge portion defining an opening and having a periphery and a slot extending from the periphery of the second hinge portion to the opening of the second hinge portion, the second hinge portion rotatably connected to the first hinge portion such that the openings of the first and second hinge portions are aligned;
  a retainer non-rotatably mounted to the hub and defining a slot aligned with the hub, the second hinge portion being disposed between the retainer and the first hinge portion; and
  a wave spring disposed between the retainer and the second hinge portion for biasing the second hinge portion along the hub toward the first hinge portion, the wave spring defining a gap aligned with the slot of the hub;

selecting the relative position of the first hinge portion and the second hinge portion such that the slot in the first hinge portion and the slot in the second hinge portion are aligned for allowing access to the openings of the first and second hinge portions from an exterior of the hinge;

disposing an electrical connector into the openings through the slots in the first hinge portion and the second hinge portion;

rotating the first hinge portion relative to the second hinge portion such that the mobile terminal is in the open position and the slot in the first hinge portion and the slot in the second hinge portion are not aligned for capturing the electrical connector in the hinge, and rotating the first hinge portion relative to the second hinge portion such that the mobile terminal is in the closed position and the slot in the first hinge portion and the slot in the second hinge portion are not aligned for capturing the electrical connector in the hinge.

20. A method for connecting first and second housing members of a mobile terminal as recited in claim 19, further comprising the steps of securing the first hinge portion to the first housing member, and securing the second hinge portion to the second housing member.

21. A hinge for use in a mobile terminal including at least two body portions each having an inner major surface and an opposed outer major surface, the hinge pivotally connecting the two body portions for movement between an open position of the mobile terminal where the inner major surfaces of the body portions are spaced from one another and a closed position of the mobile terminal where the inner major surfaces of the body portions are proximate one another, the hinge comprising:

a first hinge portion defining an opening and having a periphery and a slot extending from the periphery of the first hinge portion to the opening, the first hinge portion adapted to be secured to one of the at least two body portions, the first hinge portion comprising a hollow hub which at least partially defines the opening in the first hinge portion, wherein the hub has a slot substantially aligned with the slot extending from the periphery of the first hinge portion for allowing access to the opening in the first hinge portion;

a second hinge portion defining an opening and having a periphery and a slot extending from the periphery of the second hinge portion to the opening, the second hinge portion adapted to be secured to the other of the at least two body portions;

a retainer non-rotatably mounted to the hub and defining a slot aligned with the hub, the second hinge portion being disposed between the retainer and the first hinge portion; and a wave spring disposed between the retainer and the second hinge portion for biasing the second hinge portion along the hub toward the first hinge portion, the wave spring defining a gap aligned with the slot of the hub;

wherein the first hinge portion and the second hinge portion are rotatably connected such that the openings of the first and second hinge portions are aligned, the first and second hinge portions relatively rotatable between a first position where the slot in the first hinge portion and the slot in the second hinge portion are aligned for allowing access to the openings of the first and second hinge portions from an exterior of the hinge, a second position where the slot in the first hinge portion and the slot in the second hinge portion are not aligned and the openings of the first and second hinge portions cannot be accessed from the exterior of the hinge, and a third position where the slot in the first hinge portion and the slot in the second hinge portion are not aligned and the openings of the first and second hinge portions cannot be accessed from the exterior of the hinge, wherein the second position and the third position correspond to an open position and a closed position, respectively, of the mobile terminal; and a grommet rotatably disposed in the hub, the grommet having a length and a longitudinal slot extending the length of the grommet, the grommet rotatable within the hub between a first position where the slot in the grommet and the slots in the first hinge portion and the second hinge portion are aligned for allowing access to the interior cavity of the hinge, and a second position where the slot in the grommet and the slots in the first hinge portion and the second hinge portion are not aligned and the interior cavity of the hinge cannot be accessed from the exterior of the hinge.

* * * * *